Sept. 26, 1950      S. W. RUSSELL      2,523,846

TRACTOR-TRUCK AND TRAILER BRAKE EQUIPMENT

Filed Dec. 3, 1946      3 Sheets-Sheet 1

Inventor

Sam W. Russell

By *Clarence A. O'Brien and Harvey B. Jacobson*
Attorneys

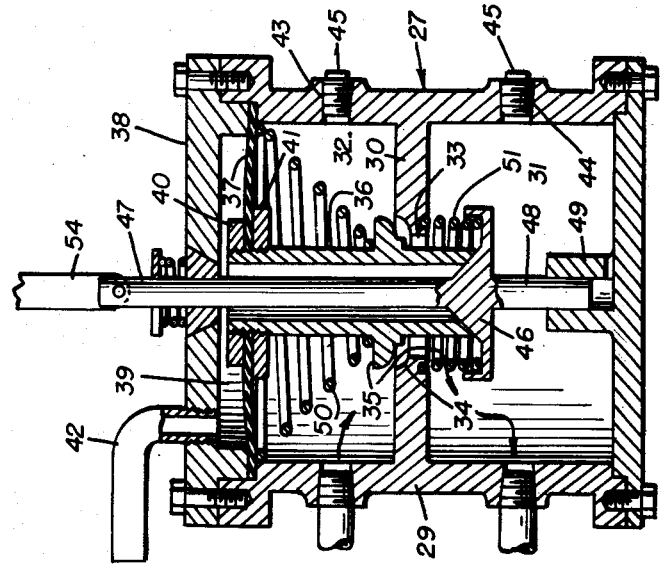
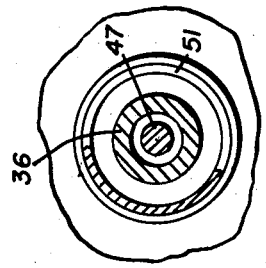
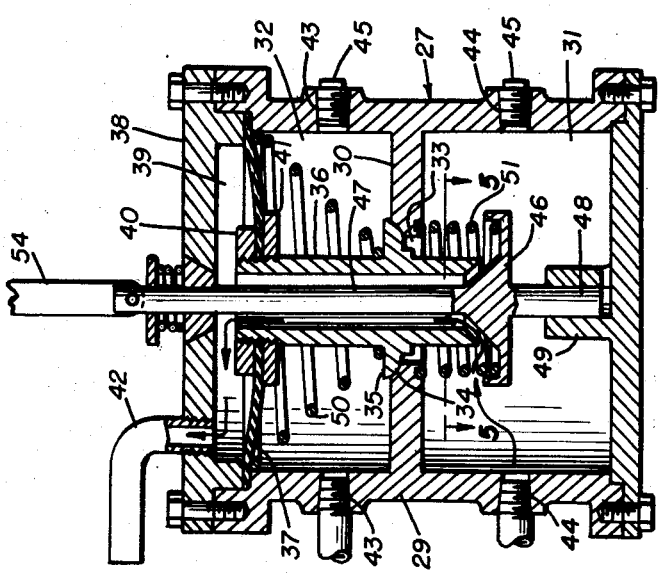

Patented Sept. 26, 1950

2,523,846

UNITED STATES PATENT OFFICE 2,523,846

TRACTOR-TRUCK AND TRAILER BRAKE EQUIPMENT

Sam W. Russell, Knoxville, Tenn.

Application December 3, 1946, Serial No. 713,673

3 Claims. (Cl. 188—3)

This invention relates to tractor-truck and trailer brake equipment, and has more particular reference to installation of a safety auxiliary application valve in the emergency line of such equipment, whereby to automatically vent the emergency relay valve to the atmosphere and thereby cause application of the trailer brakes in case of the driver of the truck should lean or fall forward or sidewise, while driving, due to falling asleep or becoming unconscious.

The primary object of the present invention is to provide a safety auxiliary application valve in the emergency line of tractor-truck and trailer brake equipment, whereby the trailer brakes will be released when the driver of the truck leans against the back of the driver's seat in proper position for driving, and whereby the trailer brakes will be applied if the driver of the truck should lean or fall forward or sidewise, while driving, due to falling asleep or becoming unconscious. Thus, by using the present application valve, the safety of the vehicle and its occupants is promoted, and the occurrence of serious accidents from a well known cause is prevented.

A further object of the invention is to provide a safety application valve of the above kind which may be readily installed in existing brake equipment, which is highly efficient in operation, and which is comparatively simple in construction.

The exact nature of the present invention, as well as more specific objects and features thereof, will become apparent from the following description when considered in connection with the drawings, in which:

Figure 3 is a central vertical sectional view of the safety application valve drawn on an enlarged scale and shown in its normal condition;

Figure 4 is a view similar to Figure 3, showing the safety application valve in its operated condition;

Figure 5 is a fragmentary horizontal section taken on line 5—5 of Figure 3.

Figure 1:
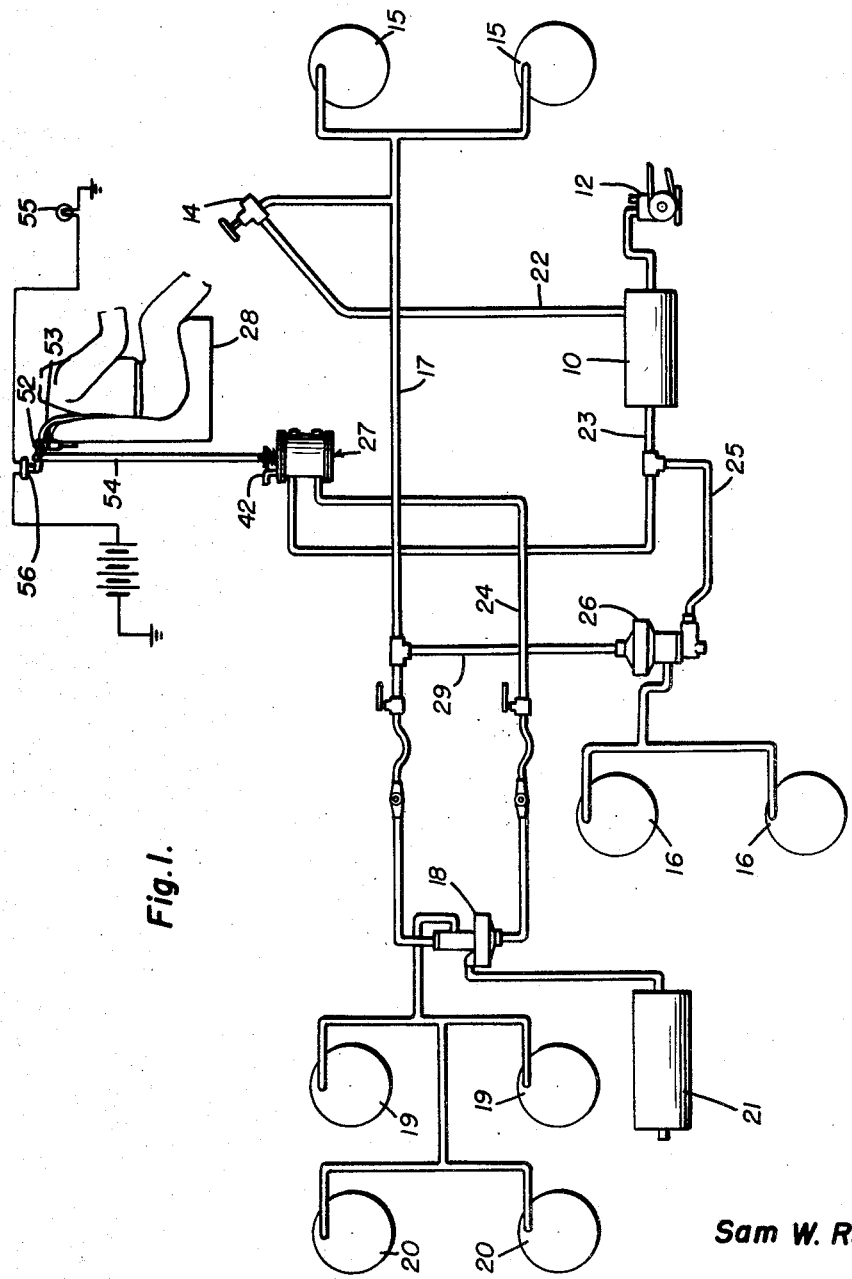
Figure 1 is a diagrammatic view of one form of tractor-truck and trailer brake equipment embodying my safety application valve.

In Figure 1 there is disclosed compressed-air tractor-truck and trailer brake equipment comprising a truck or main reservoir 10 charged by a compressor 12. A foot operated application valve 14 on the truck controls the brake pressure to the front and rear truck brake actuators 15 and 16 respectively, and also controls, through a service line 17, the operation of an emergency relay valve 18, the latter controlling the operation of the trailer brake actuators 19 and 20. The valve 18 is conventional and of the type shown at 32 in the U. S. patent to W. A. Eaton, 2,024,343, December 17, 1935 and at 25 in the U. S. patent to D. H. Robinson, 2,248,437, July 8, 1941. The air pressure for the trailer brake actuators is supplied by a trailer reservoir 21 connected to the emergency relay valve 18. The main or truck reservoir 10 has an outlet line 22 that connects with the service line 17 and has the application valve 14 interposed therein. The main or truck reservoir 10 also has a second outlet line 23 that is connected with the emergency relay valve 18 by an emergency line 24, and that has a branch 25 connected with the rear truck actuators 16 and having a quick release valve 26 interposed therein.

My safety auxiliary application valve, indicated at 27, is interposed in the emergency line 24 and is arranged on the tractor-truck near the driver's seat 28 of the latter. It will be noted that a line 29 also connects the service line 17 with the quick release valve 26, as usual.

My auxiliary application valve 27 is preferably of the construction more clearly shown in Figures 3 to 5 inclusive. As shown in the latter figures, said valve 27 includes a suitable casing 29 divided by a partition 30 into chambers 31 and 32. The partition 30 has a central opening 33 affording communication between the chambers 31 and 32, and a valve seat 34 is formed in the upper side of the partition 30 in surrounding relation to the opening 33. A valve head 35 is arranged to seat downwardly on the seat 34, and this valve is provided on the intermediate portion of a vertical tubular stem 36 that extends through the opening 33 of partition 30. The margin of a diaphragm 37 is clamped between an internal shoulder of the casing 29 and a removable cover 38 of said casing, said diaphragm dividing the casing into a further small top chamber 39. The diaphragm 37 has a central opening which receives the upper end of the stem 36, and the inner margin of diaphragm 37 is clamped between clamping nuts 40 and 41 threaded on the upper end of stem 36. Thus, the stem 36 provides for communication between lower chamber 31 and the top chamber 39, and the opening 33 provides for communication between the lower chamber 31 and the intermediate chamber 32. The cover 38 has a vent 42 which places the top chamber 39 in communication with the atmosphere. Casing 29 has a port 43 at each of opposite sides which open into the chamber 32, and a port 44 at each of opposite sides which open into the chamber 31. In use, the ports 43 and 44 at either side are used to install the valve in the emergency line 24, the other two ports 43 and 44 being closed by plugs 45. A valve head 46 is arranged to seat upwardly against the lower end of the stem 36 within the lower chamber 31, and this valve head 46 is carried by the lower end of a vertical stem 47 which freely extends through the stem 36 and through the cover 38, and which is of considerably less diameter than the bore of stem 36. The valve head 46 has a central depending guide stem 48 slidably received in a tubular guide 49 provided on the bottom of the casing 29. The valve head 35 is normally yieldingly seated by a spring 50, and the valve head 46 is normally unseated by a spring 51, so that communication between the chambers 31 and 32 is normally closed by the valve head 35 and the valve head 46 is normally unseated to establish communication between the chamber 31 and the chamber 39 through valve stem 36. In practice, the chamber 31 is placed in communication with the side of the emergency line which connects with the emergency relay valve 18, and the chamber 32 is connected with the side of the emergency line 24 which communicates with the truck reservoir 10. It will thus be apparent that when the valve 27 is in its normal condition of Figure 3 the valve head 35 closes communication between the truck reservoir 10 and the relay valve 18, and valve head 46 is unseated so as to vent the relay valve 18 to the atmosphere through valve stem 36, chamber 39 and vent 42. This venting of the relay valve 18 acts the same as a break in the emergency line and causes application of the trailer brakes exactly the same as an ordinary break in the emergency line will do. However, if the valve 47 is pulled upwardly against the action of springs 50 and 51 so as to seat the valve head 46 against the lower end of stem 36 and to unseat the valve head 35 as shown in Figure 4, communication will be established between the relay valve 18 and the truck reservoir 10 by way of opening 33, and communication of the relay valve with the atmosphere will be closed by seating of valve head 46 against the lower end of valve stem 36, thereby causing release of the trailer brakes. The compressor 12 and reservoir 10 may be considered as a brake actuating source on the truck.

Pivoted between its ends at 52 to the top of the back rest of the driver's seat 28 is a lever 53, one arm of which is relatively long and extends forwardly and then downwardly in front of and adjacent the upper portion of said back rest. The other shorter arm of lever 53 is connected by a link 54 with the upper end of valve stem 47. The arrangement is such that when the driver occupying the seat 28 leans backwardly against the back rest of seat 28 and assumes a proper position for driving, the long arm of lever 53 will be pressed rearwardly so as to cause the link 54 to be pulled upwardly and thereby unseat valve head 35 and simultaneously seat valve head 46. In doing this, the spring 51 is compressed until the valve head 46 engages the lower end of stem 36, whereupon stem 36 is elevated and spring 50 is compressed. As before stated, this establishes communication between the truck reservoir 10 and relay valve 18 by way of opening 33 as shown in Figure 4, simultaneously closing communication between chamber 31 and vent 42. This is the normal condition of the brake equipment in which the trailer and truck brakes are released, application of the trailer and truck brakes being normally effected by actuation of the conventional application valve 14. However, should the driver lean forward so as to release lever 53 and permit the valve to assume its normal condition as shown in Figure 3, the relay valve 18 will be vented to the atmosphere by way of chamber 31, stem 36, chamber 39 and vent 42, and communication will be simultaneously closed between relay valve 18 and the truck reservoir 10. This relieves the diaphragm of the relay valve from air pressure so as to cause air to be supplied to the trailer brake actuators and thereby applying the trailer brakes in a manner generally well known in the art with respect to the occurrence of an ordinary break in the emergency line of the equipment.

If desired, means may be provided to indicate that the safety application valve is in use and operative. For this purpose, the circuit of an indicator lamp 55 may be controlled by a normally open push button switch 56 arranged to be actuated to circuit closing position by the lever 53 when the longer arm of said lever is pressed rearwardly by the operator in assuming a proper driving position. Also, suitable means may be provided to releasably hold the lever 53 with its longer arm in rearwardly pressed position and the trailer brakes released, so that the driver may lean forwardly and laterally away from the longer arm of lever 53 as is necessary in order to obtain a view through the adjacent side window of the driver's cab when backing the vehicle. This is an obvious expedient which is mentioned for its interest to those making use of the invention and is not shown or specifically described because it is of no patentable moment, per se.

Figure 2:
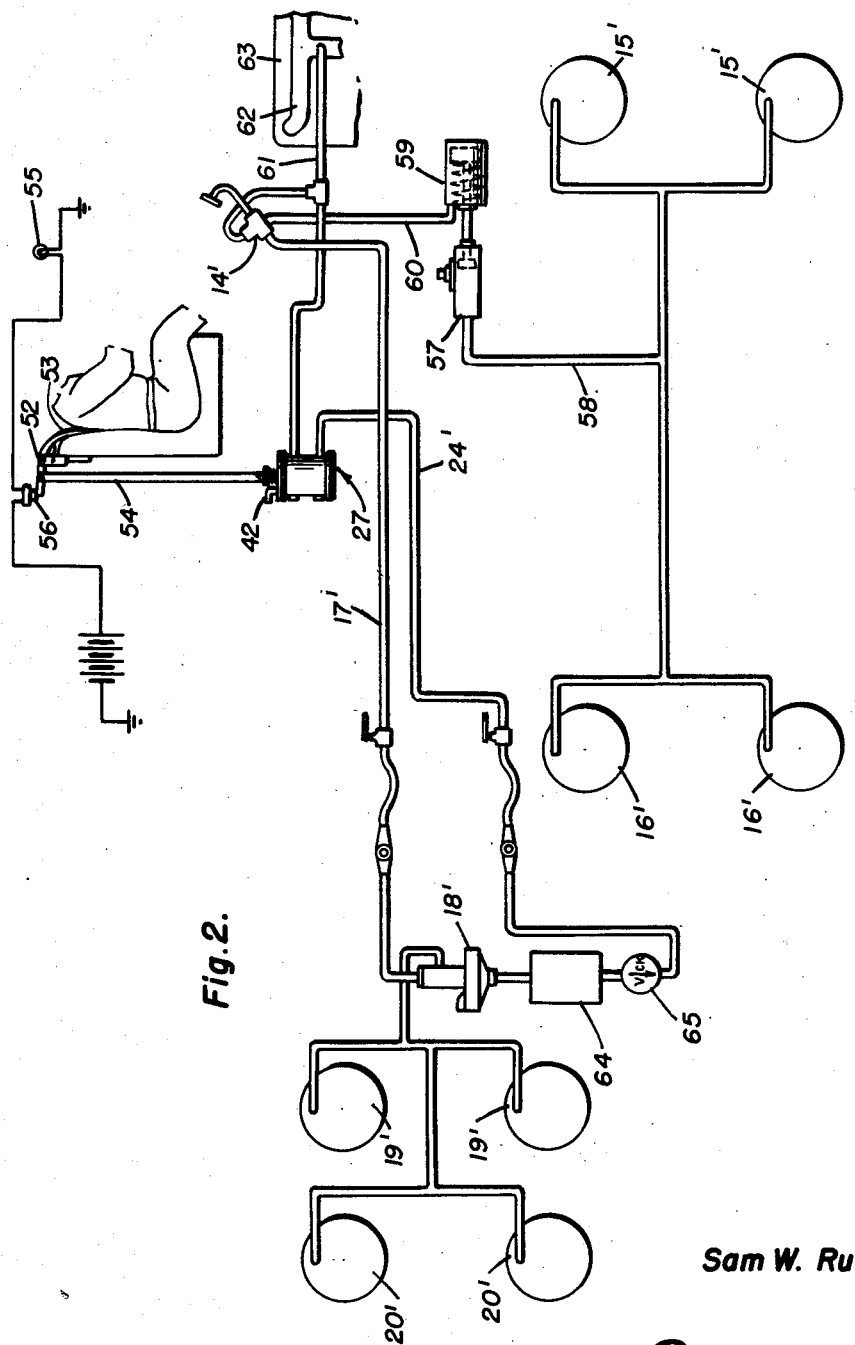
Figure 2 is a view similar to Figure 1 of another type of tractor-truck and trailer brake equipment embodying the present safety application valve.

In Figure 2, the present safety application valve is shown as installed in brake equipment embodying hydraulic brakes on the tractor truck actuated by a vacuum booster and vacuum brakes on the trailer. The front and rear brake actuators of the truck are indicated at 15' and 16', respectively, and the front and rear brake actuators of the trailer are indicated at 19' and 20' respectively. A master pressure cylinder 57 is connected by a branched line 58 with the actuators 15' and 16', and it includes a plunger actuated by vacuum booster 59 having its suction line 60 connected with the foot operated application valve 14' which controls communication of the booster with a suction line 61 connected to the intake manifold 62 of the tractor-truck engine 63. The brake equipment also includes a service line 17' connecting the emergency relay valve 18' with the application valve 14', and an emergency line 24' connecting the emergency relay valve 18' with the suction line 61. As usual, the emergency vacuum tank 64 and check valve 65 are interposed in the emergency line 24' near the relay valve 18'. Actuation of the application valve 14' permits production of suction in the service line 17' and in the suction line 60 to effect application of the truck and trailer brakes, release of the application valve 14' effecting release of said brakes in the well known manner. In installing the present safety application valve in equipment of this kind, it is simply interposed in the emergency line 24' as shown and the lever 53 is arranged exactly the same as described in connection with the equipment of Figure 1. The arrangement is such that when the valve 27 is in the normal condition of Figure 3 air is admitted from the atmosphere through vent 42, chamber 39, stem 36, and chamber 31 to that portion of the emergency line 24' leading to the emergency relay valve 18'. The suction maintained in the trailer vacuum tank 64 causes application of the trailer brakes at this time, the check valve 65 being closed. However, when the lever 53 is actuated by leaning of the driver against the same, the valve 27 assumes the condition of Figure 4 in which the communication of the emergency line 24' with the atmosphere is closed and communication of said emergency line 24' with the suction line 61 is opened. This causes actuation of emergency relay valve 18' so that the brake actuators of the trailer are relieved of suction and so that the trailer brakes are thereby released. It will thus be apparent that should the driver lean or fall forward, while driving, due to falling asleep or becoming unconscious for any reason, the safety application valve 27 will automatically assume its normal condition as shown in Figure 3, thereby automatically causing application of the trailer brakes and bringing the truck and trailer to a stop so as to prevent the occurrence of an accident. Substantially the same operation takes place in connection with both types of installations, the difference being that in the installation of Figure 1 the emergency line is vented to the atmosphere so as to relieve the emergency line of pressure, whereas said emergency line is placed in communication with the atmosphere in the installation of Figure 2 to admit atmospheric air into the emergency line and thereby relieve the latter of suction. Otherwise, the elements of both installations are alike, and remaining elements in both installations are indicated by similar reference characters.

From the foregoing description, it is believed that the construction, operation and advantages of the present invention will be readily understood and appreciated by those skilled in the art. Minor changes are contemplated, such as fairly fall within the scope of the invention as claimed.

What I claim is:

1. The combination with tractor-truck and trailer brake equipment including an emergency relay valve on the trailer, a brake actuating source on the truck, and service and emergency lines connecting said relay valve and said source, and wherein a main application valve is operable by the driver for causing venting of the relay valve to the atmosphere to cause application of the trailer brakes, of an auxiliary application valve interposed in said emergency line and normally venting the relay valve to the atmosphere and simultaneously closing communication between the relay valve and said source, said auxiliary application valve being operable to establish communication between the relay valve and said source and to simultaneously close communication of the relay valve with the atmosphere, and means operable by the driver of the truck in leaning against the back of the driver's seat of the truck for operating said auxiliary application valve to establish communication between the relay valve and said source and to simultaneously close communication of the relay valve with the atmosphere.

2. The combination with tractor-truck and trailer brake equipment including an emergency relay valve on the trailer, a brake actuating source on the truck, and service and emergency lines connecting said relay valve and said source, and wherein a main application valve is operable by the driver for causing venting of the relay valve to the atmosphere to cause application of the trailer brakes, of an auxiliary application valve interposed in said emergency line and normally venting the relay valve to the atmosphere and simultaneously closing communication between the relay valve and said source, said auxiliary application valve being operable to establish communication between the relay valve and said source and to simultaneously close communication of the relay valve with the atmosphere, and means operable by the driver of the truck in leaning against the back of the driver's seat of the truck for operating said auxiliary application valve to establish communication between the relay valve and said source and to simultaneously close communication of the relay valve with the atmosphere, said last named means including an actuating lever for said auxiliary application valve having an arm arranged to be pressed rearwardly by the driver of the truck in leaning back against the back rest of the driver's seat.

3. The combination with tractor-truck and trailer brake equipment including an emergency relay valve on the trailer, a brake actuating source on the truck, and service and emergency lines connecting said relay valve and said source, and wherein a main application valve is operable by the driver for causing venting of the relay valve to the atmosphere to cause application of the trailer brakes, of an auxiliary application valve interposed in said emergency line and normally venting the relay valve to the atmosphere and simultaneously closing communication between the relay valve and said source, said auxiliary application valve being operable to establish communication between the relay valve and said source and to simultaneously close communication of the relay valve with the atmosphere, and means operable by the driver of the truck when assuming a proper driving position for operating said auxiliary application valve to establish communication between the relay valve and said source and to simultaneously close communication of the relay valve with the atmosphere, said means being releasable when the driver assumes an improper driving position so as to allow the auxiliary application valve to assume its normal condition and thereby cause application of the trailer brakes.

SAM W. RUSSELL.

REFERENCES CITED

The following references are of record in the file of this patent:

UNITED STATES PATENTS

| Number | Name | Date |
|---|---|---|
| 650,609 | Otis | May 29, 1900 |
| 1,582,879 | Midboe | Apr. 27, 1926 |
| 2,226,584 | Schober | Dec. 31, 1940 |
| 2,229,023 | Amneus | Jan. 21, 1941 |
| 2,258,881 | Brown | Oct. 14, 1941 |
| 2,266,264 | Reid | Dec. 16, 1941 |
| 2,279,276 | Oliver | Apr. 7, 1942 |
| 2,305,638 | Rockwell | Dec. 22, 1942 |
| 2,451,139 | Williams et al. | Oct. 12, 1948 |